(12) United States Patent
Nockermann et al.

(10) Patent No.: US 6,689,408 B2
(45) Date of Patent: Feb. 10, 2004

(54) METHOD FOR DEEP-FRYING PRODUCTS TO BE DEEP-FRIED AND DEVICE FOR CARRYING OUT THIS METHOD

(75) Inventors: Otto Nockermann, deceased, late of Gummersbach (DE); by Bernd Nockermann, legal representative, Halver (DE); by Martin Nockermann, legal representative, Bremen (DE)

(73) Assignees: Bernd Nockemann, Halver (DE); Martin Nockemann, Bremen (DE)

(*) Notice: Subject to any disclaimer, the term of this patent is extended or adjusted under 35 U.S.C. 154(b) by 0 days.

(21) Appl. No.: 10/101,304

(22) Filed: Mar. 19, 2002

(65) Prior Publication Data

US 2002/0174776 A1 Nov. 28, 2002

Related U.S. Application Data

(63) Continuation of application No. PCT/EP00/09227, filed on Sep. 21, 2000.
(60) Provisional application No. 60/154,995, filed on Sep. 21, 1999.

(51) Int. Cl.[7] ............................. A23L 1/01; A47J 37/12
(52) U.S. Cl. ......................... 426/438; 99/407; 99/408; 426/439
(58) Field of Search ................................. 426/438, 439, 426/523; 99/403, 407, 408, 330, 331; 210/DIG. 8

(56) References Cited

U.S. PATENT DOCUMENTS

| 1,659,415 A | | 2/1928 | Thomas |
| 3,210,193 A | * | 10/1965 | Martin ........................ 426/438 |
| 3,638,558 A | | 2/1972 | Bennett et al. |
| 3,688,683 A | | 9/1972 | Boggs |
| 4,623,544 A | * | 11/1986 | Highnote ..................... 426/438 |
| 5,973,297 A | * | 10/1999 | Winter et al. .................. 99/408 |

FOREIGN PATENT DOCUMENTS

| EP | 0 426 516 A1 | 5/1991 |
| WO | WO 9516379 | 6/1995 |

* cited by examiner

Primary Examiner—George C. Yeung
(74) Attorney, Agent, or Firm—Sonnenschein, Nath & Rosenthal

(57) ABSTRACT

The invention relates to a method and a device for deep-frying products to be deep-fried with hot fat. Fat that is conveyed in a circuit by a pump is heated, brought into contact with the product to be deep-fried and filtered. The quantity of fat circulating in the circuit is kept to a minimum by using a heating device in which a minimal volume of fat reaches the required temperature as quickly as possible for heating the fat and by using lines with as small cross-section as possible and which are as short as possible for transporting the fat.

36 Claims, 11 Drawing Sheets

US 6,689,408 B2

METHOD FOR DEEP-FRYING PRODUCTS TO BE DEEP-FRIED AND DEVICE FOR CARRYING OUT THIS METHOD

This application is a continuation of International Application PCT/EP00/09227, filed Sep. 21, 2000 designating the United States and claiming priority to U.S. provisional application Serial No. 60/154,995 filed Sep. 21, 1999. All of the foregoing applications are incorporated herein by reference to the extent permitted by law.

BACKGROUND OF THE INVENTION

This invention concerns a method for deep-frying products to be deep-fried and a device for carrying out this method.

In conventionally designed immersion fryers a relatively few products to be deep-fried are fried in a relatively large amount of hot fat.

The quality features of products that have been deep-fried are a fine crust, a soft hot inside and a low fat content which, however, must not be so low as to reduce the typical fried taste.

In traditional immersion fryers, the exceptionally low thermal conductivity of the fat requires a large amount of fat to act as a heat accumulator so that, once the products to be deep-fried are placed in the fat, the drop in temperature in the frying zone is limited to such an extent that the crust formation prevents the products to be deep-fried from being fully soaked with fat as quickly as possible. The large amount of fat in the immersion fryer must be heated all day long because of the long heating-up time. What is more, around the heating elements temperatures of up to 300° C. predominate, which means that the thermal gradient is 130° C. at a target fat temperature of 170° C. This partial overheating and the thermal permanent load of the fat contribute to a considerable extent to a reduction in the quality of the fat.

In the system of a conventionally designed immersion fryer (standing liquid, heating by means of an enclosed heating coil or via the external walls) during deep-frying the drop in temperature in the deep-frying zone is intensified when the quantity of fat is reduced, since the cooling effect resulting from the introduction of products to be deep-fried is not offset by additional heating owing to the extremely slow thermal convection in the medium. An example of this is standard household fryers, which always produce deep-fried products of inferior quality.

That is why, in system gastronomy, the method used is to keep on increasing the quantity of fat and hence the storage of heat in the immersion fryer, resulting in a products to be deep-fried-to-fat ratio of currently up to 1:29, which corresponds to two baskets containing 680 grams of chips in 40 liters of fat; this ratio may even go up to 1:58, since only one basket is often used. But here too, because of the slow convection of heat from the heating surfaces to the deep-frying zone, the added effect is limited and the deep-frying quality can be improved further.

On the other hand, reducing the amount of fat is desirable since this has a number of advantages during deep-frying, chips (referred to in the U.S. as french fries, but referred, in this application by the British term "chips") absorb approximately 5% of their original weight in deep-frying fat. This fat is taken out of the system and must be replaced by fresh fat in order to maintain the overall quantity of fat. In conventionally designed immersion fryers this does in fact improve the quality of the fat for a short time, but the harmful substances that are released accumulate over time, with the result that the quality of the fat continues to fall until the limiting values are exceeded after about 20 to 30 hours of operation and the entire contents of the fryer have to be discarded. The most important harmful substances are total polar materials and polymers. They arise out of the degraded products of the products that have been deep-fried, and out of chemically transformed fat components (see above: thermal permanent load and partial overheating). After approximately 4 to 5 operating hours, the quality of the products that have been deep-fried diminishes with the rise in the amount of harmful substances that are released, hence apace with the progressive worsening of the quality of the fat, since the harmful substances are absorbed by the products to be deep-fried. The refreshing effect brought about by replacing the fat that has been removed does not last and cannot ultimately prevent the quality of the fat from falling to the legally prescribed point at which the fat must be renewed (24% for total polar materials, 12% for polymer components). By reducing the amount of fat in proportion to the amount of products to be deep-fried, the refreshing effect brought about by replacing the fat that has been absorbed increases proportionally (since the quantity of fat that has been removed and needs to be replaced remains constant in relation to the quantity of the products to be deep-fried, while the amount of fat that needs to be refreshed is reduced) until finally the harmful substances no longer accumulate beyond the limiting values, but settle around a constant value which gets smaller as the products to be deep-fried-to-fat ratio gets lower.

With such an effective refreshing method there is no longer any old fat that needs to be discarded and so a quality of fat can be achieved that is consistently good, but, using the state-of-the-art immersion frying method, adequate convection of heat to the frying zone to produce quality frying cannot be achieved. Because the temperature is too low and cannot rise, so much fat penetrates the products to be deep-fried before the crust is formed that the quality of the products to be deep-fried drops massively (in this case not through the accumulation of harmful substances but as a result of not achieving the aforementioned quality features).

Methods and devices for deep-frying products to be deep-fried in hot fat are also known, in which the fat is pumped into a cycle in which it is heated up, brought into contact with the products to be deep-fried and filtered. In this case, a very large quantity of hot fat is always brought into contact with a relatively small quantity of goods to be deep-fried during the deep-frying process. The disadvantage of this is that, for example, the large amount of fat cannot be heated up quickly for individual frying processes. As a result, the fat must be kept at a constant operating temperature of between 170° C. and 190° C. and it is similarly exposed to a damaging permanent load. Nor can a refreshing effect like the one described above be achieved. What is more, the state-of-the-art method is very cost intensive and also harmful to the environment, since a very large quantity of fresh fat is always needed to deep-fry a relatively small amount of products to be deep-fried. The advantages of this cycle frying method over the immersion frying method relate only to the temperature distribution in the frying zone.

According to the state of the art it is therefore impossible to produce deep-fried products of a qualitatively high standard by capitalizing on the advantages of a reduced quantity of fat.

SUMMARY OF THE INVENTION

Proceeding on the basis of the existing state of the art, this invention is based on the problem of coming up with a method for deep-frying products to be deep-fried and a device for carrying out this method which, by minimising the quantity of fat used, guarantees the consistent quality of the fat, avoids the emergence of old fat that has to be disposed of and limits the use of fresh fat for the replacement of fat that is discharged together with the products that have been deep-fried. At the same time, this method generates sufficiently high temperatures in the deep-frying zone, which can be maintained during the deep-frying process, in order to achieve the quality of deep-fried products that meets the requirements of collective and individual gastronomy, to improve this quality even further and to maintain it at a constantly high level for an unlimited period of time. In addition, the thermal permanent load and partial overheating of the fat must be avoided so as to limit the build-up of harmful substances.

By keeping the quantity of fat circulating in a circuit or cycle as small as possible, the quantity of fat circulating in the fat cycle is always sufficient not to break the cycle. The small amount of circulating fat allows extremely short heating-up times, with the result that the fat can be heated up for each deep-frying process according to requirements. Constantly keeping a large quantity of fat hot, which would lead to a damaging permanent load of the fat and would also be very energy intensive, is thus avoided. Since a relatively large proportion of the small total amount of fat in the cycle is discharged together with the products that have been deep-fried, using the method according to the invention, the fat that is discharged together with the products that have been deep-fried is always being replaced by fresh fat, since fat is constantly being fed through, with the result that the circulating quantity of fat can be kept at a consistently low level. In this way, the quantity of fat is kept to a minimum and the pumping cycle is not broken as a result of a lack of fat.

Especially when compared with state-of-the-art immersion fryers or cycle fryers using a traditionally large quantity of fat, the deep-frying method and corresponding device according to the invention provide at least the same quality of the products that have been deep-fried with a much lower use of fat and produces a much improved constant fat quality. If, for example, the usual 680 grams of chips are fried in 2.5 liters of fat (ratio of approx. 1:3.7) instead of in 10–20 liters, as in the case of immersion fryers, then, with a fat absorption of 5% of the original weight of the deep-fried products, the entire quantity of fat can be completely replaced by fresh fat after around 74 fryings. This refreshing effect outpaces the contamination of the fat in the small total quantity of fat and means that the quality of the entire quantity of fat remains good and any replacement of fat is eliminated. As a result of the small total quantity of fat, short heating-up times can be attained in comparison to the traditional immersion frying method, which means that permanent heating is not necessary. By saving fat and energy, operating costs can be cut by at least DM 1,400 a year when compared to a comparable 10l immersion fryer.

Because of the way in which heating takes place over large heating surfaces in a thinner layer and with a quicker flow, this system means that, for the first time, the cooling effect caused by the products to be deep-fried is offset in a small total quantity of fat to such an extent that a constantly high deep-frying temperature results. In addition, the shortest deep-frying times and the lowest saturation of the products with fat are possible because the heat is directed to the surfaces of the products to be deep-fried by the fat that is flowing through with an intensity that was not achieved before. This type of heating also gives rise to considerably reduced thermal gradients, with the result that partial overheating on the heating surfaces is avoided.

An advantageous development of the method according to the invention provides that the ratio of the total weight of the products to be deep-fried to the circulating fat lies between 1:1.5 and 1:6, preferably between 1:2 and 1:3.5. This makes it possible for the fresh fat that continually replaces the fat that has been discharged together with the products that have been deep-fried to account for such a large proportion of the reduced total quantity of fat that this is always of good quality and the emergence of old fat that needs to be disposed of is completely avoided.

Another advantageous embodiment of the method according to the invention provides that fat flows through a vat to accommodate the products to be deep-fried, which is located in the fat cycle, within 4 to 6 seconds. This rapid circulation of the small quantity of fat enables the surfaces of the products to be deep-fried to be heated up extremely quickly, which is not possible with any other existing method. The fat that has cooled down through being in contact with the products to be deep-fried is quickly carried away and replaced by flowing hot fat. The ensuing rapid 'sealing' of the products to be deep-fried causes low fat absorption and ensures that the products to be deep-fried are deep-fried in a very short time.

An advantageous development of the device according to the invention provides that the feed direction of the pump can be reversed and that the pump has a reversing device with a time switch and which, after a predetermined frying time, reverses the feed direction of the pump. This means that, at the end of a pre-specified frying time, the feed direction can be reversed, for example by toggling the poles of the pump, until the remaining fat is sucked out of the vat together with the deep-fried products. In this way, the basket lift device, which is becoming increasingly common with currently designed heavy duty fryers and incurs manufacturing costs of approximately DM 1,000 is replaced by a switch that costs less than DM 100. What is more, this provides the fast-food industry in particular, as one of the main users of deep-frying technology, with a device that makes the quality of the deep-fried products largely independent of the attentiveness of badly trained assistants. Negligent or malicious frying in putrid fat is ruled out with this invention. Frying can only take place if there is enough fat in the cycle. Fat shortfalls are always replaced by the necessary fresh fat intake, which means that the deep-frying fat in the cycle is always in good condition. The higher manufacturing costs of devices according to the invention as compared to heavy-duty fryers without basket lift devices are recouped in less than a year. Furthermore, in comparison to basket lift fryers, devices according to the invention are unrivalled in both price and performance.

Another advantageous development of the device provides that the space between the bottom of the vat and the products to be deep-fried is limited on the side of the products to be deep-fried by means of a swage block whose holes are arranged and/or dimensioned in such a way that fat flows out of the space into the products to be deep-fried evenly distributed over the surface of the swage block. This enables all the products to be deep-fried to come into uniform contact with the hot fat.

Another advantageous embodiment of the device provides that a basket to accommodate the products to be deep-fried can be placed inside the vat and that the upper edge of the basket extends out over the upper edge of the vat, which is open at the top, and that, at least in the area extending out over the upper edge of the vat, the basket has holes which retain the particles that have separated from the deep-fried products in the basket. This means that particles that have separated from the deep-fried products do not get into the fat cycle and hence impair the quality of the fat, since the particles can remain in the basket together with the deep-fried products and can be taken out of the cycle together with the deep-fried products.

Another advantageous development of the device provides that, in the side wall of the vat for accommodating the products to be deep-fried, close to the bottom of the vat, there is an opening to feed the fat back to the heating device, which is open whilst the fat is being heated and closed whilst frying is taking place. This enables the fat in the cycle to be heated up very quickly.

Another measure according to the invention for quickly heating up the fat to the correct temperature for deep-frying is to place the products to be deep-fried inside the deep-frying basket before the deep-fryer is switched on, without paying heed to the current temperature of the fat. This additional, especially advantageous, development of the method and the device provides that, once the deep-fryer is switched on, the pump initially pumps the deep-frying fat into a small cycle by directing the fat over a temperature-controlled magnetic valve or thermostatic valve directly into the upper area of the fat collection zone. Once the fat has reached the correct temperature for deep-frying (e.g. 180° C.), the valve closes and the hot fat is fed into the products to be deep-fried via one of the pipes passing in front of the valve. This sets off the deep-frying cycle, which has already been described. The end of the deep-frying process is indicated by means of an acoustic or optical signal after a period of time that has been determined empirically. In this way, the operators are not required to keep an eye on the temperature of the fat.

Another advantageous development of the device provides that the vat for accommodating the products to be deep-fried consists of a basic part, which is not very tall, and a leak proof part that can be inserted inside the basic part and is tall enough to accommodate the products to be deep-fried. Whilst the fat is heating up, the insertable part is removed and then replaced for the frying stage. This means that, with the insertable part removed during the heating-up phase, the fat can be heated up very quickly (analogous to the opening of the opening for the feedback in the embodiment described above).

An embodiment of the invention is a removable deep-frying vat, over the upper edge of which the deep-frying fat overflows. The deep-frying vat is connected to a filtering bottom, which covers the bottom of the outer receptacle. The filtering material of the filtering bottom is interrupted under the edge of the deep-frying vat, all the way around, such that there are two filtering surfaces which are mechanically separated from each other—a central surface, as the bottom of the deep-frying vat, and a surface encircling the central surface—which together form the bottom of the filter. The deep-frying vat and the filtering bottom can be removed and are locked in place and sealed as shown in FIG. 11 (basket with integrated filter). A standard deep-frying basket made from wire netting is placed inside the deep-frying vat. The fat rises in the deep-frying vat, flows through the products to be deep-fried in the basket and runs over the upper edge of the deep-frying vat to run off through the encircling filtering bottom. As an alternative to the encircling part of the filtering bottom, separately removable filter bags are inserted circumferentially between the outer receptacle and the deep-frying vat, which sit tightly on the edge of the deep-frying vat, with the result that overflowing fat reliably flows away through the filter bags.

An especially attractive embodiment of the invention is a basket with side walls that are closed, apart from the overflow holes. The height at which the overflow holes, which are equipped with the appropriate filtering material, are located determines the extent to which the basket can be filled with the products to be deep-fried. The closed side walls replace the already described deep-frying vat into which a wire basket is inserted. In the laterally closed deep-frying basket the products to be deep-fried lie on a wide-meshed wire bottom. Underneath this wire bottom, on three sides, there is an slide-in cleat for a replaceable filtering bottom. On the remaining open side the filtering bottom can be removed horizontally. Alternatively, the filtering bottom can be locked below or in the basket with a state-of-the-art clamping mechanism. Using another locking device, the basket is held tightly on the bottom of the outer receptacle so as to prevent rising fat from getting between the basket and the outer receptacle and flowing away. FIG. 11 shows a possible form of the locking device using spring steel elements. Sealing is guaranteed by means of a sealing band, made out of PTFE for example, which is attached circumferentially under the edge of the basket in the bottom of the outer receptacle.

Another advantageous embodiment of the device according to the invention provides that a pipe to feed the fat into the vat to accommodate the products to be deep-fried ends inside the confines of the vat and at the height of its upper edge and that there are outlets at this end. This enables the advantages described at the outset to be achieved with a device that directs the fed-in hot fat onto the products to be deep-fried from above.

Another advantageous embodiment of the device according to the invention provides for an outlet cock on the deepest side of the cycle at least to allow the fat to drain away. This means that, for cleaning purposes, the fat can be removed completely from the device and the device can be flushed with cleaning fluid in order to meet hygiene requirements.

Other advantageous embodiments of the device according to the invention and the method according to the invention are given in the remaining subordinate claims. This invention will now be illustrated with the help of figures.

DETAILED DESCRIPTION OF THE PREFERRED EMBODIMENT

Figure 1:
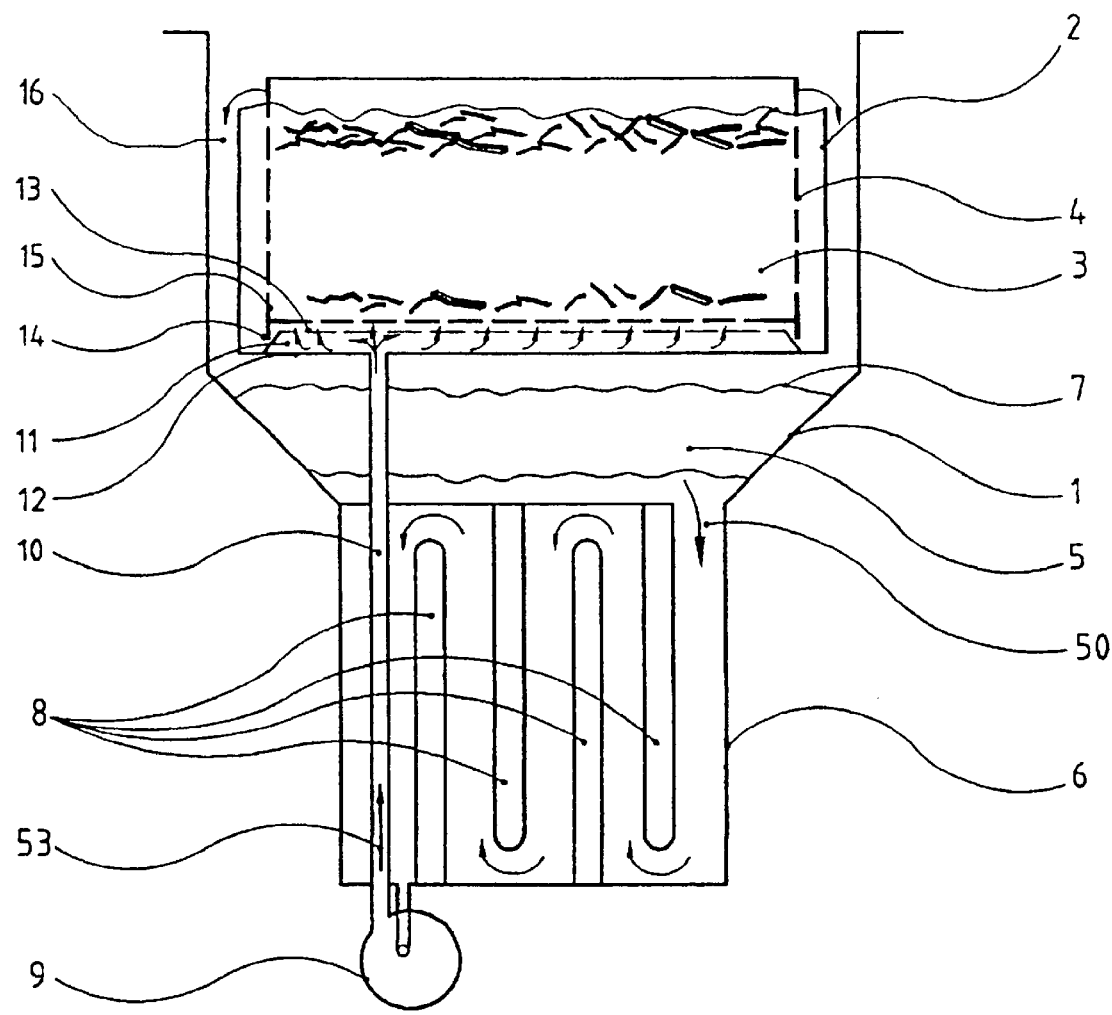
FIG. 1 shows a deep-frying device according to the invention during the deep-frying phase.

FIG. 1 shows a deep-frying device according to the invention. An outer receptacle formed by a device casing (1) contains, in its upper region, a deep-frying vat (2) with products (3) to be deep-fried in deep-frying basket (4). The deep-frying basket (4) and the deep-frying vat (2) are designed in the shape of a cube. Naturally, other embodiments are possible: the deep-frying basket and the deep-frying vat can be designed in the shape of a cylinder, at least in sections. Underneath the deep-frying vat (2) is a fat collection zone (5) of the outer receptacle (1). Underneath the fat collection zone (5) is a heating area (6). The heating area (6) is connected to the fat collection zone (5) via a pipe opening out into the fat collection zone (5). Together with the side wall of the deep-frying vat (2), which accommodates the products to be deep-fried, and the deep-frying basket (4), the outer receptacle (1) forms a gap (16) to direct the fat leaving the deep-frying vat (2) over the edge of the latter to the fat collection zone (5) and the heating area (6). The fat collection zone (5), which is beneath the deep-frying vat (2), is essentially in the shape of an upturned pyramid. Other embodiments are of course possible. Below the fat collection zone (5) is a heating area (6), which preferably has panel heaters (8), which are arranged in parallel at a short distance from each other, so that they form a meandering (or, alternatively, a wavy or serpentine) flow path for the fat that is flowing through. The panel heaters (8) can be arranged higher up so as to be in contact with the bottom of the vat (2). When the deep-fryer is out of service, the deep-frying fat fills the fat collection zone (5) up to the maximum level (7). The panel heaters (8) in the heating area (6) are arranged such that the deep-frying fat flows past large heating surfaces in thin layers. In this way, the fat absorbs enough heat from the outer surfaces of the panel heaters (8), which are heated to a maximum 190° C. to 210° C., even when flow speeds are high, so that it can be fed by the pump (9) in the direction of the arrow (53) as hot deep-frying fat heated to between 170° C. and 180° C. At the end of the meandering flow path formed by the panel heaters (8), a pump (9) is connected to the heating area (6). The pump (9) is connected to the deep-frying vat by means of feed pipe (10). The pump (9) therefore lies in the fat cycle downstream from the heating device formed by the heating area (6) and the panel heaters (8) and upstream from the vat for the products to be deep-fried. The feed direction of the pump (9) can be reversed. The pump (9) also contains a reversing device with a time switch (not shown), which, after a predetermined deep-frying time reverses the feed direction of the pump from the direction (53) set during the deep-frying time. In the region of the pump (9), which is the deepest point of the fat cycle, is an outlet cock (not shown), which is used to drain away the entire quantity of fat in the fat cycle. The two sheets (12 and 13) are tightly joined around the sides and form the distribution device (11), out of which the hot fat can only flow through the openings in the distribution plate (13) in the direction of the products (3) to be deep-fried. The distribution device (11) is connected to the feed pipe (10) via an opening in the bottom sheet (12). The fat that is fed through the feed pipe (10) into the bottom (12) of the distribution device (11) and the vat (2) is taken up in the distribution device (11) and allowed to pass upwards through the holes in the plate (13) in order to achieve an even distribution of the fat in the deep-fryer vat (2).

A number of measures have been envisaged to even out the circulation of the products (3) to be deep-fried. Firstly, the pump (9) generates such a high stagnation pressure inside the distribution device (11) that the fat flows out of all the openings of the distribution plate (13) inside the deep-frying vat (2) at a uniform speed. Secondly, evening out the flow of fat flowing through the products (3) to be deep-fried is also achieved by the grid structure of the bottom of the filtering basket (4) as well as the products (3) to be deep-fried themselves, which completely fill the deep-frying basket (4).

The distribution device (11) terminates laterally and circumferentially with a sealing gap into which the downward extending edge (15) of the deep-frying basket (4) is inserted. The lateral leakage of the hot deep-frying fat spilling out of the distribution device (11) is prevented by this tightly sealing connection between the distribution device (11) and the deep-frying basket (4) and the fat is exclusively fed into the deep-frying basket (4) through a perforated bottom. The fat flows through the products (3) to be deep-fried and the deep-frying basket (4) evenly and at such a speed that it flows back over the upper edge of the deep-frying vat (2) into the fat collection zone (5) in less than 10 seconds, preferably 3 to 6 seconds. The deep-frying basket (4) is taller than the encompassing deep-frying vat and is fully lined with filtering cloth. The fat flows through this filtering cloth over the upper edge of the deep-frying vat (2) into the fat collection zone (5).

All the particles from the products that have been deep-fried are retained in the deep-frying basket (4) and are removed from the fat cycle together with the products that have been deep-fried (3) when the deep-frying basket (4) is removed from the deep-frying vat (2).

The deep-frying fat then goes from the fat collection zone (5) through the heating area (6) and the pump (9) back into the feed pipe (10) and also into the deep-frying vat (2), which is connected to it, thus closing the fat cycle.

Figure 2:
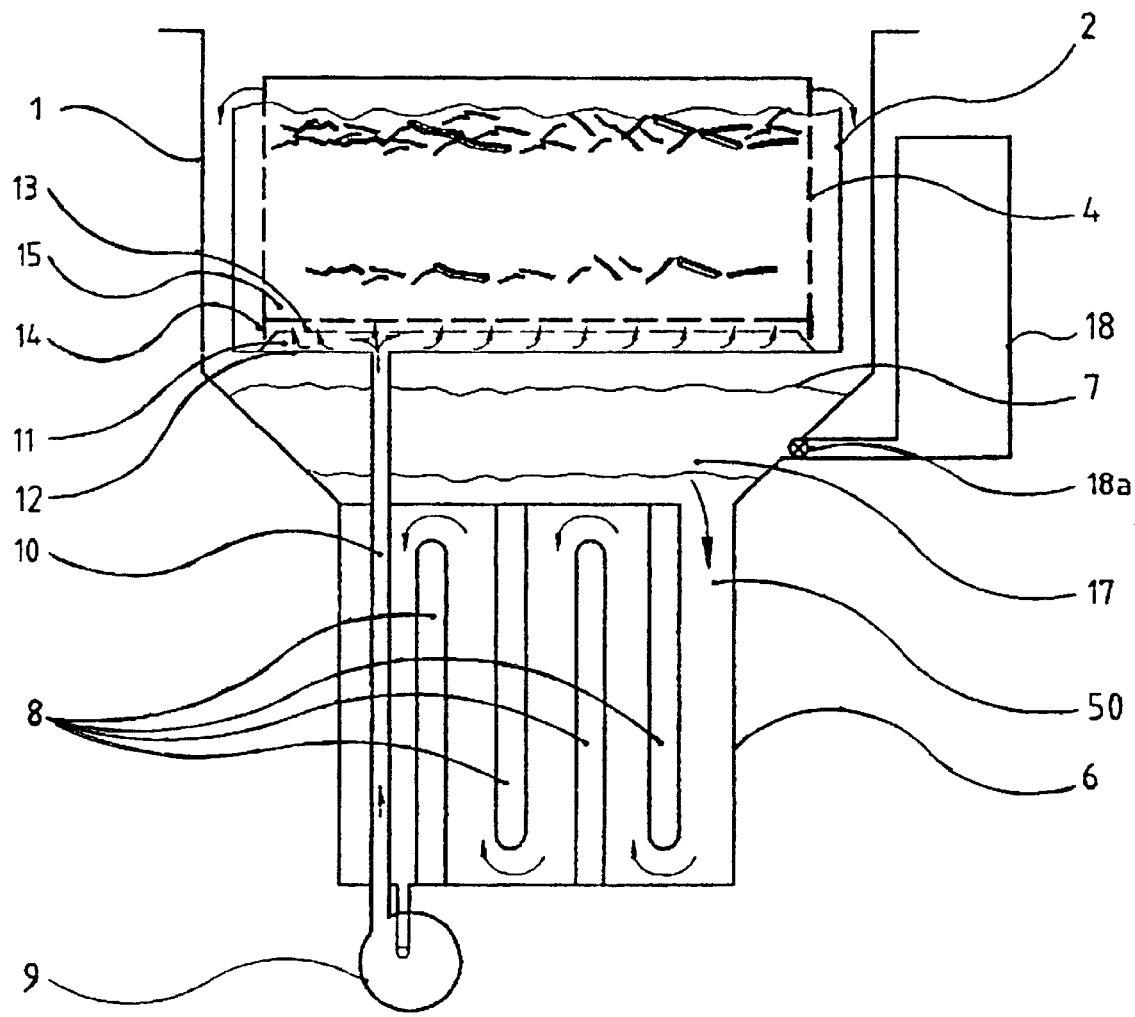
FIG. 2 shows another embodiment of a deep-frying device according to the invention with an additional vat.

FIG. 2 shows another embodiment of the deep-frying device shown in FIG. 1 with an additional vat (18), which has an opening into the fat collection zone (5). In the fat collection zone (5) there must always be enough fat to completely cover the panel heaters (8) with fat. To achieve this, the connecting pipe (50) with its opening into the fat collection zone, that is below the fat collection vat, must always be below the fat level. This is ensured by always keeping the minimum level (17) in the fat collection zone (5) of fat flowing out of the vat (18) according to the bird's drinking trough principle, or by means of a pipe with a floating ball plug (18*a*) or by means of a mechanical electrical switch or by means of an electronically controlled sensor switch (e.g. a magnetic valve). (If the fat level falls below the minimum level (17) needed to completely cover the pipe (50), the plug (18*a*) releases an opening in the vat (18) with the result that enough fat flows through until the minimum level (17) is reached.) When the minimum level (17) is reached, the plug closes again so that no more fat can flow out of the vat (18) into the fat collection zone (5).

In this way, a device is provided which, depending on the level of fat in the fat collection zone (5), controls the inflow and outflow of fat such that a level of fat in the fat collection zone (5), which is predetermined so as to prevent air getting into the fat cycle, is always maintained. The goal of minimising the quantity of deep-frying fat in the fat cycle means that the volume of all the zones through which the fat flows must be limited. However, the fat collection zone (5) must be big enough to take the fat that flows out of the cycle when the deep-fryer is switched off. The maximum level (7) in the fat collection zone (5) is then reached. The heating device (6, 8) for heating up the fat is designed so that it can bring the smallest possible volume of fat up to the required deep-frying temperature in the quickest possible time. In addition, pipes (10, 50) with the smallest possible cross-section are used to transport the fat. Furthermore, a feature of the method according to the invention is that the fat is fed from the heating device (6, 8) to the products (3) to be deep-fried along a short connecting path, here via the pipe (10). For the most widely used products (3) to be deep-fried, chips, the ratio of the total weight of the products (3) to be deep-fried to the circulating fat preferably lies between 1:1.5 and 1:6, and optimally between 1:2 and 1:3.5. The time taken for the fat to flow through the deep-frying vat (2) accommodating the products to be deep-fried, which is in the fat cycle, is preferably between 3 and 6 seconds.

It has also been shown that the ratio of the total weight of the products to be deep-fried to the fat in the fat cycle of up to as much as 1:6 can still lead to a satisfactory lasting minimum quality of the deep-frying fat, if top quality deep-frying fat with a high thermal load rating is used and the filters in the fat cycle have a very fine mesh. So, according to the 'Fritest' colorimetric analysis method of the firm, Merck, a total weight of products to be fried-to-fat ratio of 1:4.5 after 90 fryings still gave the same result of 'still good' when very good deep-frying fat was used. With a comparable fat quality, with a total weight of products to be fried-to-fat ratio of 1:3, after 160 fryings a guaranteed Fritest value of 'good' was established.

The limit that can constructively still be reached is a total weight of products to be fried-to-fat ratio of around 1:1.5. But even with other ratios, in the meaning of this invention the goal is to keep just enough (or as little as possible) fat circulating in the cycle not to break the fat cycle during the deep-frying process.

As already pointed out above, at the end of each frying period, the rotation of the pump (9) is reversed, for example by means of polar switching, until the deep-frying fat is extracted from the ready deep-fried goods (3) in the deep-frying basket (4). Then the pump and the heating are switched off because the heating-up time for the small quantity of fat is so short that the deep-frying device does not have to be constantly kept hot to be nonetheless ready for use at any time.

The deep-frying time can be set for example by means of a simple time switch which is part of the reversing device. After the time has been set, first the rotation of the pump (9) is reversed and the pump and the heating are then switched off. This simple device replaces the very expensive automatic basket lift device in immersion fryers.

In order to heat up the deep-frying fat in the deep-fryer quickly it is advisable to shorten the circulation time of the fat.

Figure 3:
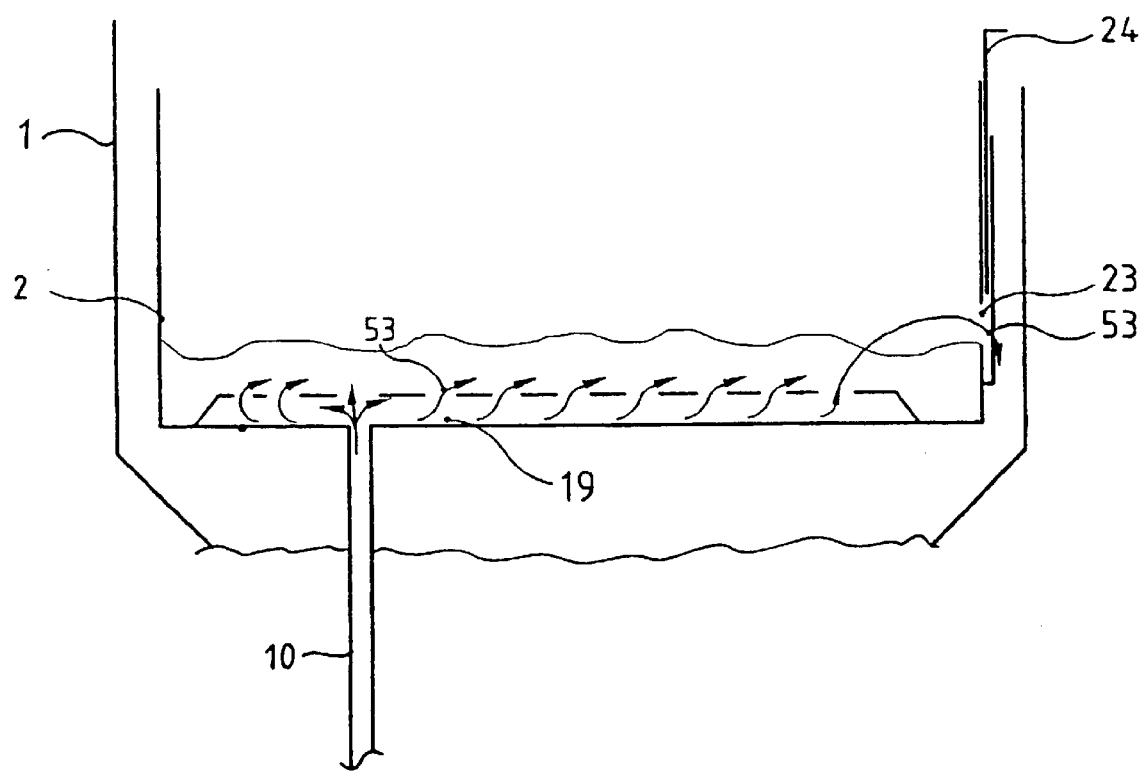
FIG. 3 gives a detailed view of the deep-frying vat of a deep-frying device according to the invention during the heating-up phase.

FIG. 3 shows a distribution device (19), which forms the bottom of the deep-frying vat (2). The distribution device (19), which is connected to a feed-pipe (10), is constructed in a similar way to the distribution device (11) shown in FIG. 1. So that the deep-frying fat can be heated up quickly, the opening (23) in the side wall of the deep-frying vat (2) just above the bottom of the deep-frying vat (2) is opened by lifting the slide-in cleat (24) and switching on the pump (9) to feed the fat in the direction of the arrow (53). The fat that is heated up in the heating device, which is fed through the feed-pipe (10) into the distribution device (19) and through the openings in the distribution device (19) into the area of the deep-frying vat (2) provided for the products (3) to be deep-fried, flows in the direction of the arrow (53) through the opening (23) in the space between the wall of the outer receptacle (1) and the deep-frying vat (2) back into the fat collection zone (5) beneath, which is in the fat cycle. So that heating can take place more quickly, the opening (23) is open during the heating-up phase of the fat and closed during the deep-frying phase of the fat. As soon as the heating-up phase is over, i.e., when the desired deep-frying temperature has been reached, the pump (9) is shut down and the slide-in cleat (24) is pushed downwards (see FIG. 4) so that the opening (23) is completely closed.

Figure 4:
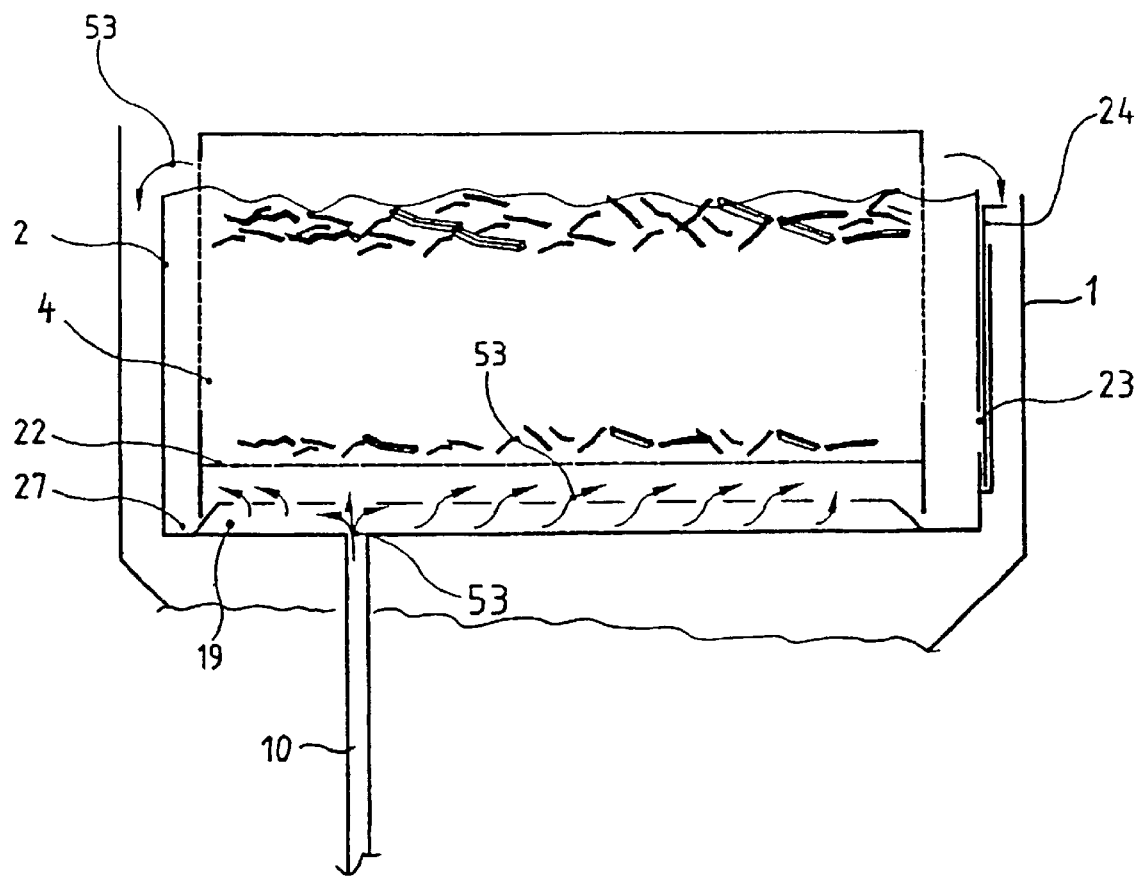
FIG. 4 gives a detailed view of the deep-frying vat of a deep-frying device according to the invention during the deep-frying phase.

FIG. 4 shows a full deep-frying basket (4), the downward extending, circumferentially closed edge (22) of which is inserted into the sealing gap (27) of the distribution device (19) such that the deep-frying fat cannot leak sideways (similar to FIG. 1) but climbs upwards without loss through the permeable bottom of the deep-frying basket (4) and the products (3) to be deep-fried, after the opening (23) is closed by means of the slide-in cleat (24). The deep-frying basket (4) is taller than the deep-frying vat (2). The height of the deep-frying vat (2) determines the maximum height of the stack of products (3) to be deep-fried in the deep-frying basket (4). (The height of the upper edge of the deep-frying vat (2) must not be exceeded by the products (3) to be deep-fried; see FIG. 4.) The deep-frying fat flows out of the stack of products (3) to be deep-fried through the walls of the deep-frying basket (4), which are designed as filters, over the upper edge of the deep-frying vat (2) into the fat collection zone (5), which is located underneath the deep-frying vat (2).

Figure 5:
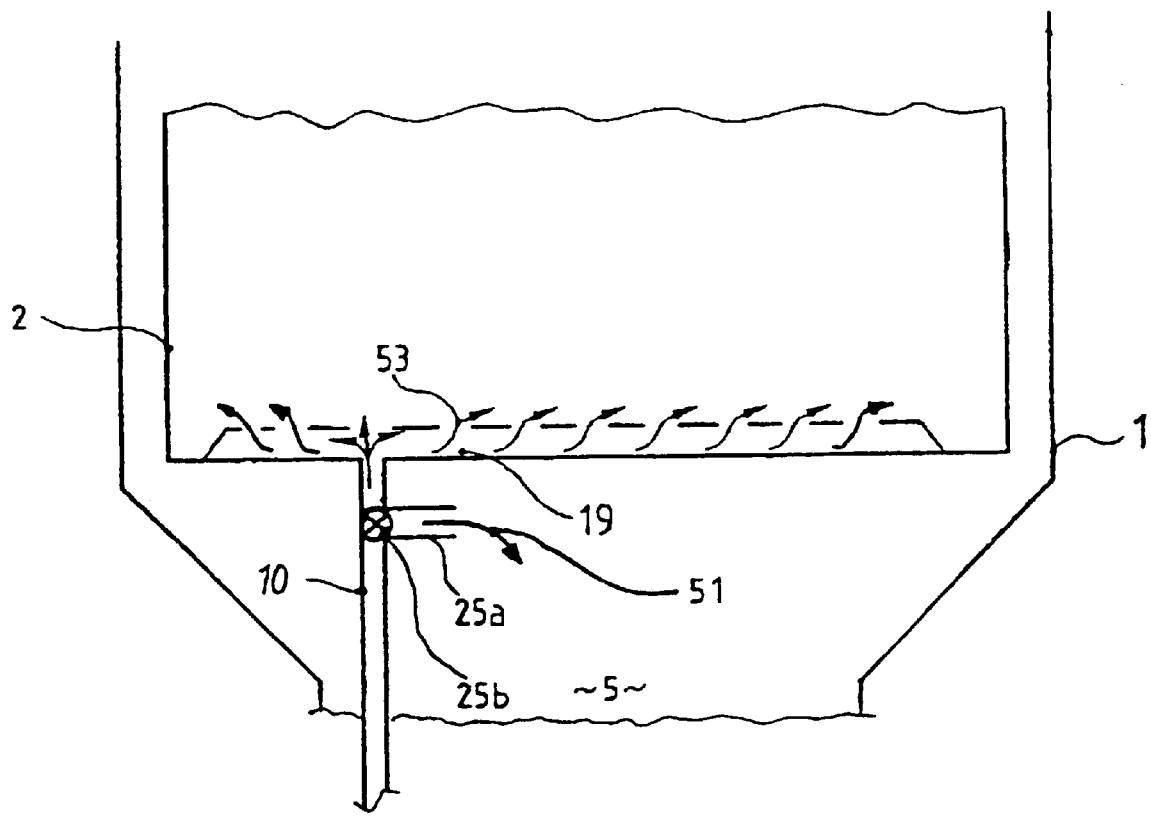
FIG. 5 gives a detailed view of the fat being fed into the deep-frying area with a short circuit to the fat collection zone.

FIG. 5 shows another, especially advantageous way of shortening the fat cycle during the heating-up phase. Below the entrance to the deep-frying vat (2), the pipe (10) has a branch (25a), which opens out into the upper region of the fat collection zone (5). On the branch there is a valve (25b), which directs the flow of fat either in direction (53) into the deep-frying vat (2), or in direction (51), via the branch (25a), into the fat collection zone (5). FIG. 5 shows both alternative flow directions (53 and 51) at the same time. The valve setting depends on the temperature of the fat. The valve (25b) can be designed, for example, as a state-of-the-art electronically controlled magnetic valve, a thermostatic valve or a temperature-controlled valve. If, during the heating-up phase, the fat has not reached the necessary deep-frying temperature (e.g. 180° C.), the flow of fat in the small fat cycle is directed via the branch (25a) into the fat collection zone (5) and, from there, reaches the heating device (6, 8) and the pump (9) (not shown). In this heating-up phase there is no fat at all in the deep-frying vat (2). As soon as the fat has reached the set deep-frying temperature, the valve (25b) switches the flow of fat from direction (51) to direction (53), so that it reaches the deep-frying vat (2) and the deep-frying cycle begins. This device fully automatically prevents deep-frying taking place in fat that is not hot enough and, at the same time, makes it possible for the operators to place the dry products (3) to be deep-fried into the deep-frying vat (2) without paying heed to the temperature of the fat and then start the heating-up and deep-frying phases, which considerably reduces the risk of accident through being sprayed by fat, amongst other things.

Figure 6:
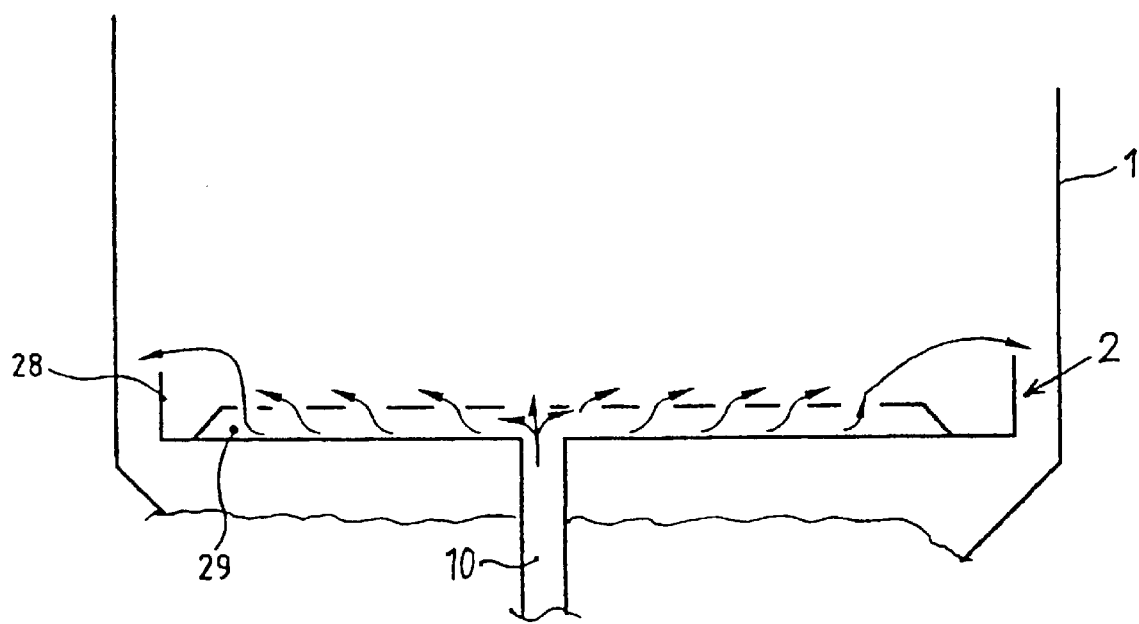
FIG. 6 gives a detailed view of another embodiment of a deep-frying device according to the invention during the heating-up phase.

FIG. 6 shows another embodiment of the deep-frying device according to the invention. In this figure, the deep-frying vat (2) has a very low wall (28). During the heating-up phase, the deep-frying fat flows straight out of the distribution device (29), which is constructed in a similar way to the distribution device (11) in FIG. 1, in all directions over the wall (28) back into the cycle, i.e., into the fat collection zone (5) below. Here, it is not necessary to open and close a slide valve, as shown for example in FIGS. 3 and 4.

Figure 7:
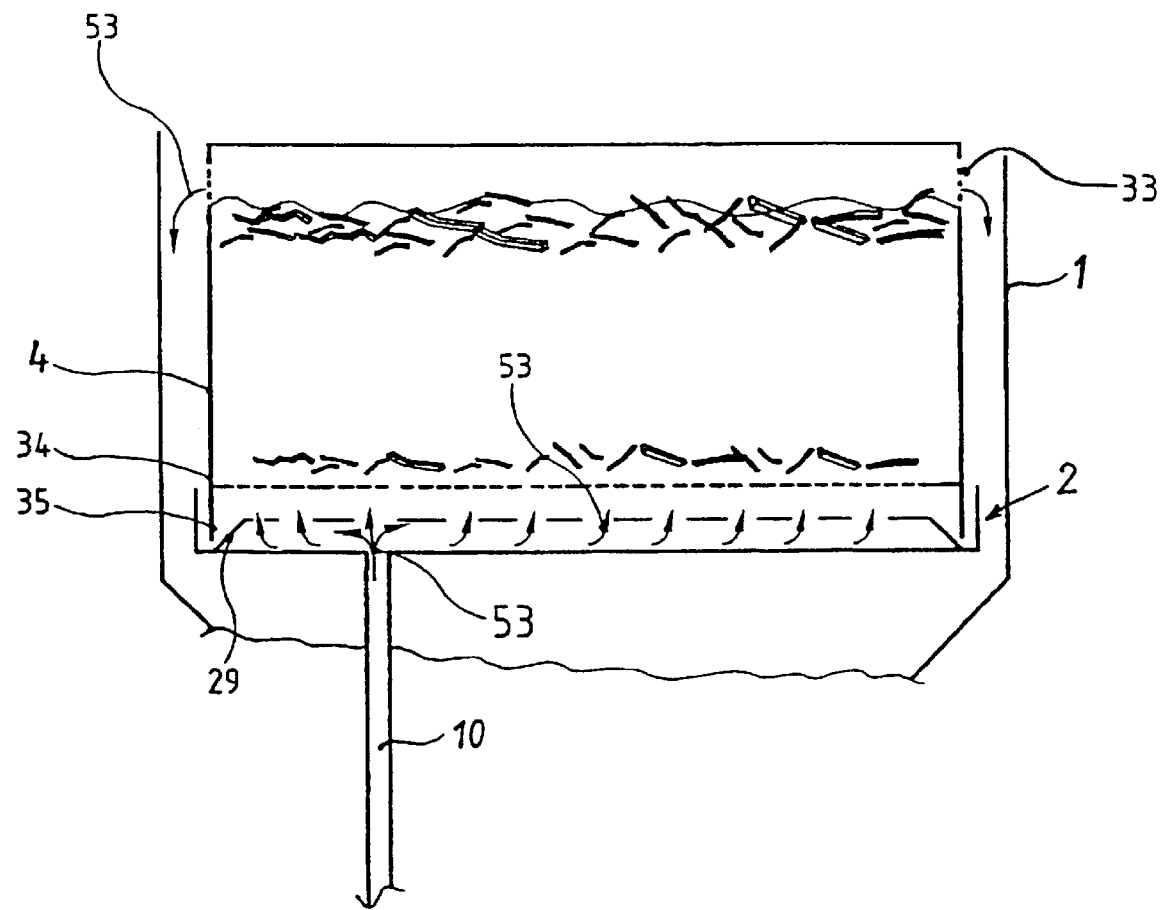
FIG. 7 gives a detailed view of the deep-frying device shown in FIG. 6 with the insertable part lowered during the deep-frying stage.

FIG. 7 shows a completely filled deep-frying basket (4), the downward extending, closed edge (34) of which is inserted into the sealing gap (35) encircling the distribution device (29) tightly enough to form a seal. In contrast to the embodiments described above, the side walls of the deep-frying basket (4) are closed and end at the top with a filter strip (33) all around. During the deep-frying phase, the hot fat flows out of the openings of the distribution device (29) in direction (53) through the permeable filtering bottom of the deep-frying basket (4) and, after flowing through the products (3) to be deep-fried, flows through the filter strip (33) which is attached all round the deep-frying basket (4) back into the fat collection zone (5). The bottom of the deep-frying basket (4) and the perforated edge running round the upper region are perforated and are made from filter netting such that the particles that have been separated from the deep-fried products (3) remain in the deep-frying basket (4).

As a variation on the embodiments shown in FIGS. 6 and 7, it is possible to have devices in which the deep-frying basket (4) is connected to the distribution device (29) by sliding in laterally, for example along clamp rails.

During the heating-up phase, the shortened fat cycle accelerates the heating-up of the entire fat contents of the deep-fryer to such an extent that, after each frying period, especially at times of the day when there is little demand for deep-fried food, the pump and the heating are switched off. The cyclical deep-frying method according to the invention therefore saves not only fat for replacement purposes but also considerable quantities of energy in comparison with conventional immersion fryers.

Figure 8:
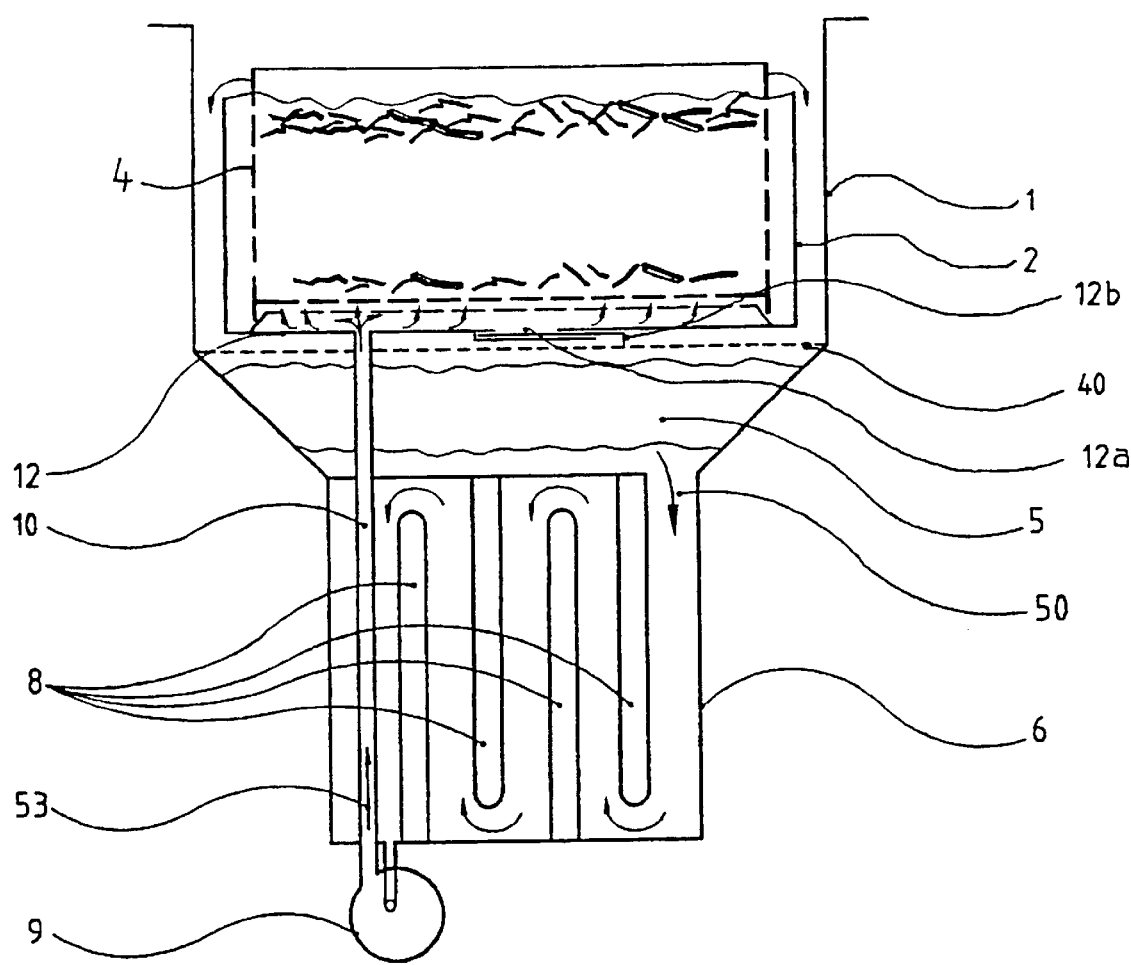
FIG. 8 shows another embodiment of a deep-frying device according to the invention with an additional filter.
Figure 9:
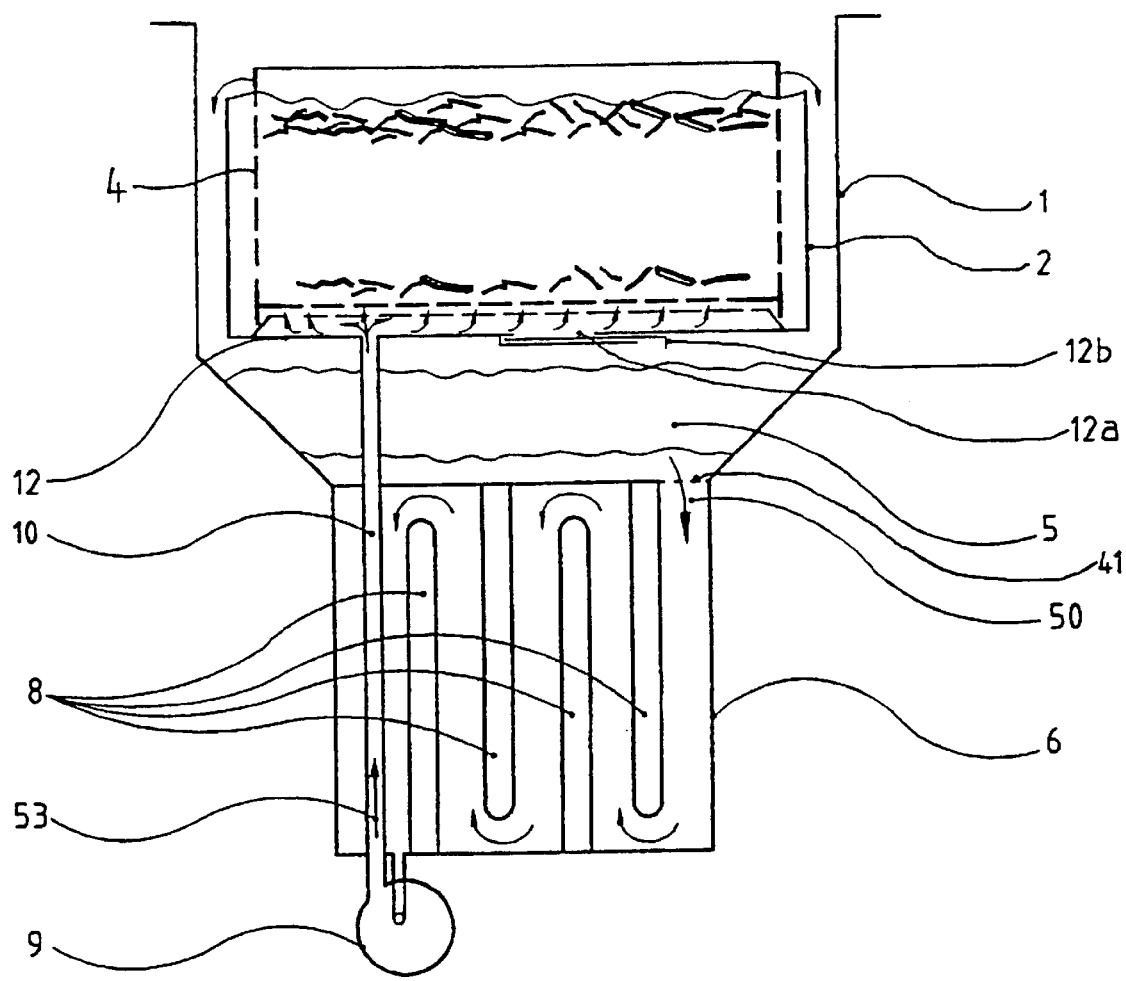
FIG. 9 shows another embodiment of the deep-frying device according to the invention shown in FIG. 8 with an additional filter in a different place.

FIGS. 8 and 9 show two possible positions of an additional filtering station with an extremely fine strainer. The filtering stations (40, 41), which take interchangeable filtering devices and those for cleaning purposes, are mounted, in the backflow of the deep-frying fat, above the fat collection zone (5) under the bottom of the deep-frying vat (2) (filtering station 40, FIG. 8), or at the interface of the fat collection zone (5) and the pipe (50) (filtering station 41, FIG. 9). The filtering stations (40, 41) are mounted such that any filtering material that is filled with particles can be easily removed from the outside and can be changed from time to time and cleaned. With this downstream filtering method, at the end of the deep-frying process it is ideally no longer necessary to pump out in order to reverse the pumping direction of the pump (9) and the fat can be drained into the fat collection zone (5) through a sluice opening (12a) in the bottom (12) of the deep-fryer vat (2), following the dead weight, and through the filtering device (40) (FIG. 8). By positioning the filtering device (41) (FIG. 9) between the fat collection zone (5) and the heating device (6, 8), the fat, together with all particles that have been carried along with it, reaches the fat collection zone (5) and is filtered when it passes into the pipe (50). This system means that, in the deep-frying phase and in the draining phase, all the fat is filtered by a single filtering station in the same direction. In order to open the opening (12a), a slide-in cleat (12b) can be activated manually or, for example, by means of an electrical control device, or other state-of-the-art equipment can be used. If, at the end of the deep-frying process, reversing the direction of the pump is dispensed with, as described here, then the heating device (6) too no longer needs to be located upstream (in the main pump direction (53)) of the pump (9), which is advantageous in the case of backward pumping since, during backward pumping, the heating device (6) could easily run dry if it were located downstream of the pump (9). The filtering station (40, 41) can be supplemented by a cyclone separator to separate stubborn particles.

The method according to the invention can also be applied by pouring the hot deep-frying fat over the products (3) to be deep-fried from above.

Figure 10:
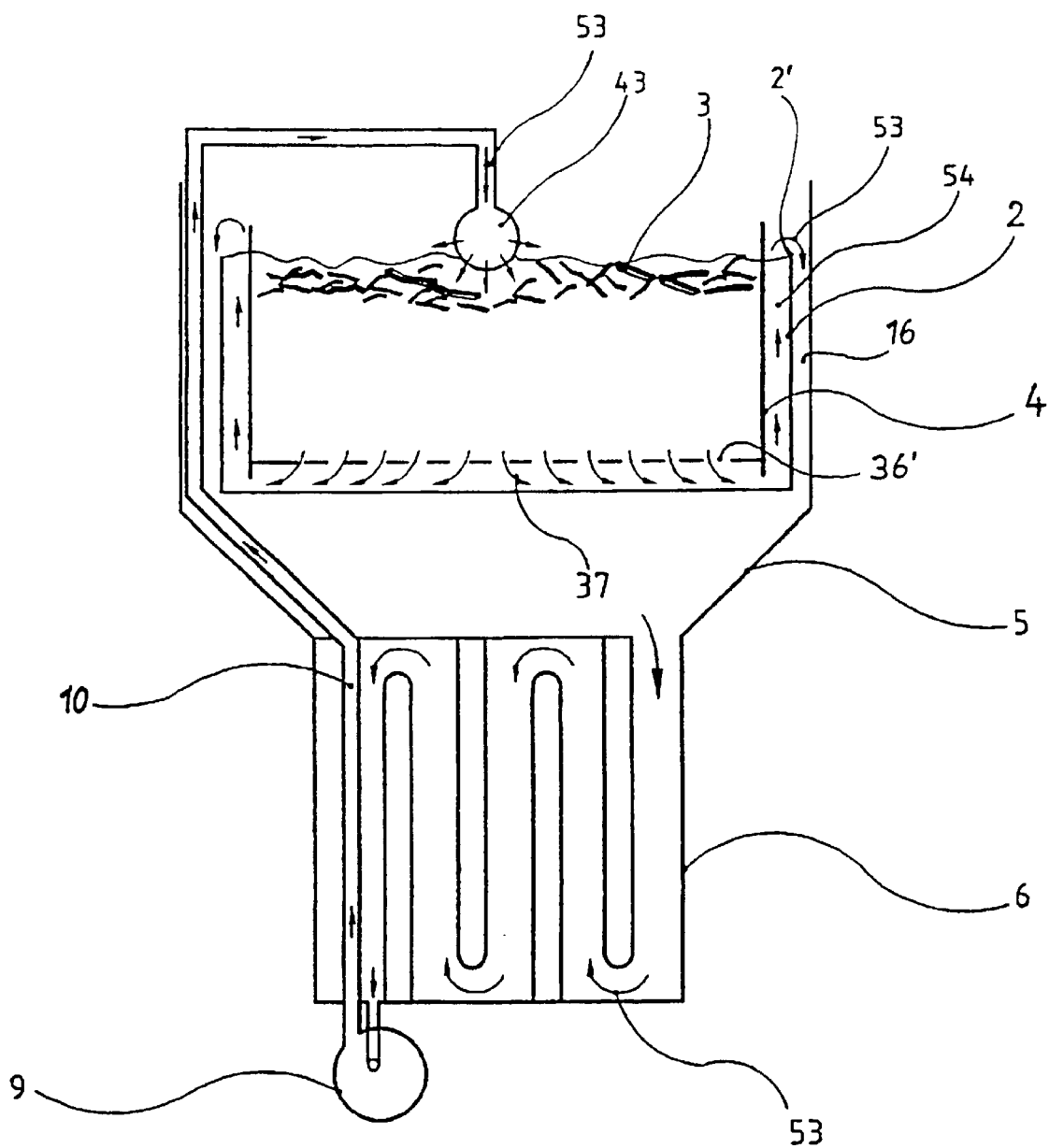
FIG. 10 shows another embodiment of the deep-frying device according to the invention.

FIG. 10 is an example of such an application. The deep-frying basket (4) is designed essentially in the shape of a cube. Its side walls (36) are closed (i.e., leak proof), whereas the bottom (37) is open and consists, for example, of filtering fabric. The deep-frying basket (4) accommodating the products (3) to be deep-fried stands in a cuboid shaped deep-frying vat (2) whose upper edge (2') is lower than that of the deep-frying basket (4). Of course, deep-frying baskets (4) and deep-frying vats (2) can be designed in the shape of a cylinder, at least in sections. The deep-frying vat (2) is made completely out of leak proof material. Concerning the fat collection zone (5), the heating area (6) and the pump (9), the deep-frying device shown in FIG. 10 fully corresponds to the deep-frying device shown in the other figures, so it is unnecessary to describe it in detail. The deep-frying fat is heated up in the heating area (6) and pumped by the pump (9) through the feed-pipe (10) up into the distribution pipe (43). The spherically designed distribution pipe (43) has evenly distributed, downward directed openings over its entire extension (hence into the deep-frying vat (2)), whose total surface area broadly corresponds to the inside cross-sectional area of the feed-pipe (10). During the deep-frying process, once the pump (9) has been switched on, the hot fat, which flows in direction (53) out of the distribution pipe (43), is first of all poured over the products (3) to be deep-fried. It flows over the products (3) to be deep-fried, through the permeable bottom (37) of the deep-frying basket (4) and initially accumulates in the deep-frying basket (4) and in the deep-frying vat (2) until it comes under high pressure in the direction of flow (53) in a gap (54) on all sides formed by the side wall of the deep-frying vat (2) and the deep-frying basket (4) and flows away over the upper edge of the deep-frying container (2) into the fat collection zone (5). During the deep-frying phase, the distribution pipe (43) is so deep in the fat level that its openings are immersed in the accumulated deep-frying fat. This means that, even with relatively few openings for the fat to flow out of the distribution pipe (43), the discharging fat flows downwards through the flow resistance caused by the accumulated fat and the products (3) to be deep-fried that are in the fat at a steady flow rate. The capacity of the pump (9) is such that the products (3) to be deep-fried are completely covered with fat within 4 to 6 seconds of the device being switched on and are continuously flowed through by heated deep-frying fat until the end of the deep-frying process.

The deep-frying process ends when the pump (9) and the heating device (6, 8) are switched off. So that the fat can drain away from the products that have been deep-fried, a sluice opening (not shown here but illustrated in FIG. 8 as 12a), which is in the bottom of the deep-frying vat (2), is opened. This opening is opened in the same way as that shown in FIGS. 8 and 9. The pipe (10), which feeds the fat into the deep-frying vat (2), ends within the confines of the deep-frying vat (2) and at the height of its upper edge. The end of the pipe (10), which has a number of outlets, extends horizontally in at least one direction inside the deep-frying vat (2), which means that the outlets are below the upper edge of the deep-frying vat (2). As in the case of the preceding embodiments, the bottom of the deep-frying basket (4) is perforated so that the particles that have separated from the deep-fried products (3) stay in the deep-frying basket (4) when this is taken out of the deep-frying vat (2).

Figure 11:
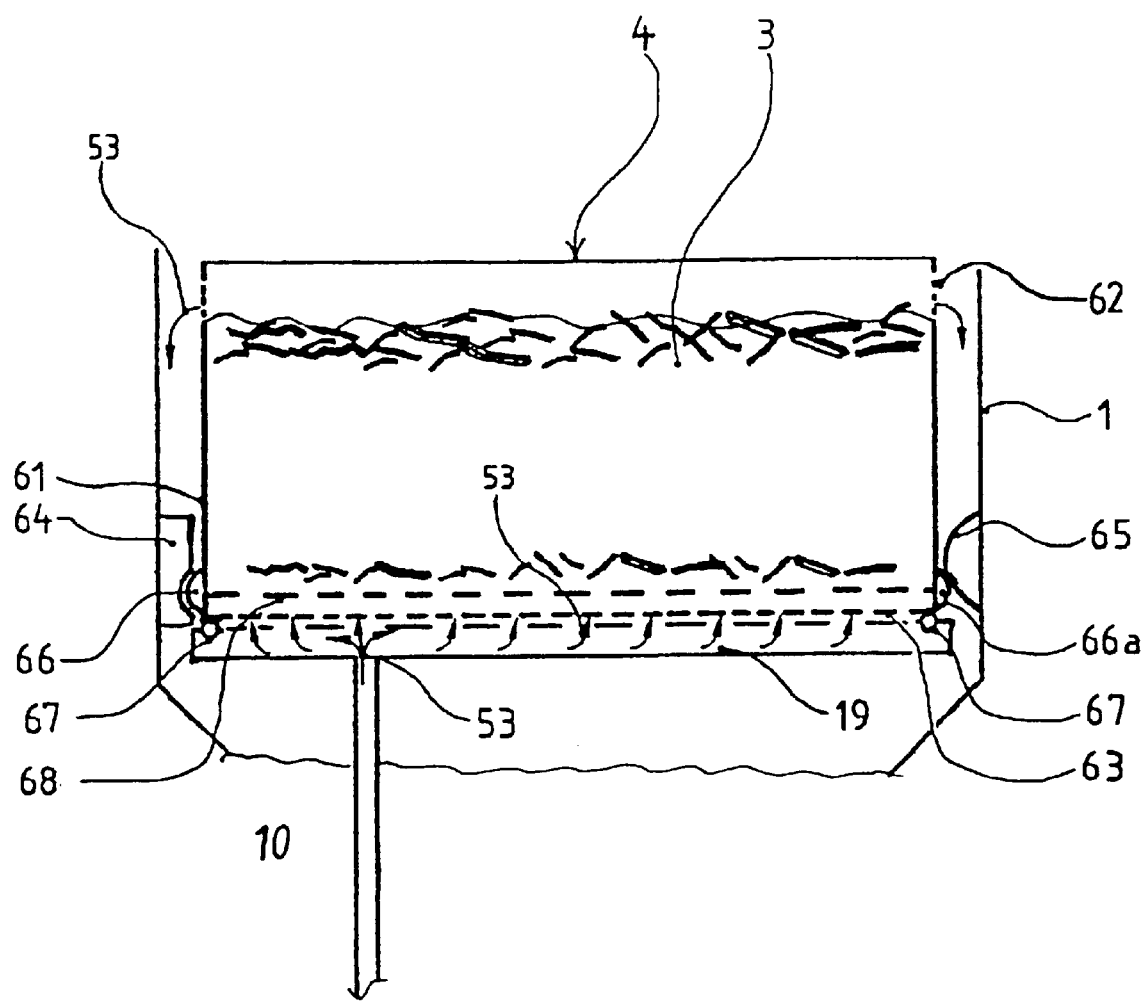
FIG. 11 gives a detailed view of the deep-frying device according to the invention with a deep-frying basket with an integrated filter.

FIG. 11 shows a deep-frying basket (4) with closed side walls (61). The side walls (61) have openings (62) all the way around which are equipped with filtering fabric, which is designed to hold back the particles that have separated from the deep-fried products (3). The products (3) to be deep-fried must not fill the deep-frying basket (4) beyond the upper edge of the filter openings (62) so that, during the deep-frying process, when the fat escapes from the deep-frying basket (4) through the openings (62) in the main direction of flow (53), the products (3) to be deep-fried are constantly covered with fat. The level of the products (3) to be deep-fried and hence the level of the filter openings (62) need to be low so that, even if the products (3) to be deep-fried cause a great deal of foam during the deep-frying phase, no fat can escape over the upper edge of the deep-frying basket (4) and all the circulating fat is filtered when it passes through the filter openings (62). Beneath the wide-meshed wire bottom (68) there is a removable filtering floor (63) which can be locked in place, for example by means of a rail running along all three sides (not shown), into which the filtering floor (63) can be pulled out horizontally from the remaining fourth side for replacement or cleaning and slid back in again.

Alternative securing methods are also conceivable, such as clamp closures or snap hinge closures. The filtering bottom (63) in the deep-frying basket (4) can also be mounted above the wire bottom (68) and from there can be lifted e.g. out of a snap hinge closure, so as to be replaced. But, in this case, the filtering material must be stable enough for it not to be destroyed without the mechanical support of the wire bottom (68), e.g. as a result of the inappropriate handling of fish forks, etc. So that the deep-frying basket (4) does not float off during the deep-frying phase, it is locked to the bottom of the case (1) or to the bottom of the distributor (19). To this end, the deep-frying basket (4) is firstly placed inside the holder (64) which is mounted on the inside of the case (1) with the cleat (66) and then it is pressed downwards into the locked position with the cleat (66a) over a spring steel stop (65). Other devices such as state-of-the art clamp closures or snap hinge closures are, of course, possible. In order to stop fat leaking down the sides under the basket (4) during the deep-frying phase and flowing back into the fat collection zone (5) without having come into contact with the products (3) to be deep-fried, the deep-frying basket (4) must be sealed against the bottom. To this end, the bottom of the casing (1) or, as shown here, the bottom of the distributor (19) has a sealing cord (67) all the way round, made out of PTFE for example, on which the deep-frying basket (4) is locked in place by means of the locking device described above and sealed.

The deep-frying vat (2), which is illustrated in the other figures, is totally superfluous in this design.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The embodiments of the invention in which an exclusive property or privilege is claimed are defined as follows:

1. A method for deep-frying products to be deep-fried in hot fat, comprising the steps of:

circulating the fat in a circuit by means of a pump, heating the fat during the circuit by utilizing a heating device comprising heating elements and having structures for defining a minimal fat volume and a maximal fat run-through velocity, bringing the heated fat into contact with the products to be deep-fried thereby deep-frying the product, filtering the fat, utilizing pipes with a minimized cross-section and a minimized length for transporting the fat through the circuit, maintaining a ratio of the total weights of the products to be deep-fried and the circulating fat of between 1:1.5 and 1:6, and constantly replacing the fat that is discharged along with the products that have been deep-fried with corresponding quantities of fresh fat.

2. A method according to claim 1, including the step of heating the fat in the heating device with low thermal gradients, by heating it on a maximized heating surface in a minimized layer thickness.

3. A method according to claim 1, including the step of maintaining a minimum quantity of fat in a fat collection zone needed to ensure that a pipe connected upstream to the fat collection zone is always kept covered with fat, so as to avoid air getting into a connection area, and inletting fresh fat in response to detection of a predetermined low quantity of fat.

4. A method according to claim 1, including the step of feeding the fat along a shortest possible connecting path from the heating device to the products to be deep-fried.

5. A method according to claim 1, including the step of maintaining a consistent quality of fat through the ongoing replacement of fat that is discharged along with the deep-fried products, with fresh fat.

6. A method according to claim 1, wherein the step of maintaining a ratio comprises maintaining a ratio of the total weights of the products to be deep-fried and the circulating fat between 1:2 and 1:3.5.

7. A method according to claim 1, including the steps of introducing the products to be deep-fried into a vat located in the circuit and flowing the fat through the vat within 4 to 6 seconds.

8. A device for deep-frying products to be deep-fried in hot fat, comprising a device housing, a pump for feeding the fat in a circuit, at least one vat located in the circuit to accommodate the products to be deep-fried, at least one heating device located in the circuit, connecting pipes extending between the heating device and the vat, a ratio of a fat accommodation volume of the heating device, the vat and the connecting pipes compared to a volume for receiving the products to be deep-fried in the vat being arranged such that a ratio of the total weights of the products to be deep-fried and the circulating fat is between 1:1.5 and 1:6, and a refilling device for supplying fresh fat, which refilling device is controlled in dependence on a fat level in the vat.

9. A device according to claim 8, wherein the vat is located above the heating device, and a fat collection zone is positioned between the vat and the heating device.

10. A device according to claim 8, wherein the pump in the cycle is positioned upstream from the heating device and upstream from the vat.

11. A device according to claim 8, wherein a feed direction of the pump is reversible and the pump has a reversing device with a time switch, which reverses the feed direction of the pump after a pre-specified frying time.

12. A device according to claim 8, wherein the pipe for feeding the fat leads into a bottom of the vat, and a distribution device is provided in a space between the bottom of the vat and the products to be deep-fried.

13. A device according to claim 12, wherein the space between the bottom of the vat and the products to be deep-fried is defined on a side which faces the products to be deep-fried by means of a swage block having holes configured in such a way that the fat flows out of the space into the products to be deep-fried evenly distributed over a surface of the swage block.

14. A device according to claim 8, wherein a top of the vat is open, and a basket is provided for accommodating the products to be deep-fried, which basket is adapted to be inserted into the vat.

15. A device according to claim 14, wherein an upper edge of the basket protrudes out over an upper edge of the vat, and that, at least in an area protruding out over the upper edge of the vat, the basket has holes, which restrain any particles that have separated from the deep-fried products in the basket.

16. A device according to claim 8, wherein, in a side wall of the vat, close to a bottom of the vat there is an opening to feed the fat back to the heating device, which opening is adapted to be open while the fat is being heated and closed while frying is taking place.

17. A device according to claim 8, wherein the vat comprises a basic part with a relatively short height and a leak proof part that can be inserted inside the basic part and extending thereabove and is tall enough to accommodate the products to be deep-fried, wherein the leak proof part is arranged to be removed for a heating-up phase and inserted for a frying stage.

18. A device according to claim 17, wherein the leak proof part is arranged as a deep-frying basket having a downward extending edge, insertable inside a corresponding gap in the basic part to form a leak proof seal, wherein side walls of the leak proof part are closed and a bottom, as well as an area close to an upper edge of the side walls, are perforated.

19. A device according to claim 8, including a deep-frying basket having closed side walls with filter openings all around at a level specified for maximum filling with the products to be deep-fried, and having a wide-meshed wire bottom, arranged to be received in the vat, under the basket there is a filtering surface taking up an entire surface area through which the fat flows between the heating device and the basket.

20. A device according to claim 19, wherein the filtering surface is arranged to be locked in place on three sides by means of a slide-in cleat, and is removable on one side for cleaning or replacement.

21. A device according to claim 19, wherein the deep-frying basket has a slide-in cleat on each of two facing walls, wherein, in order to lock the basket onto the bottom of the device housing or onto a distributor bottom, one of the cleats fits into a holder, and the other cleat fits into a locking device.

22. A device according to claim 19, wherein a bottom of the housing or of a distributor has a circumferential sealing band, onto which the deep-frying basket can be locked in place and kept sealed by means of locking devices.

23. A device according to claim 8, wherein the a pipe, which feeds the fat into the vat, has an end within the confines of the deep-frying vat and at the height of an upper edge of the vat, and that there are outlets at this end.

24. A device according to claim 23, wherein the end of the pipe that is equipped with outlets extends horizontally in at least one direction inside the vat.

25. A device according to claim 23, wherein the outlets are below the upper edge of the vat.

26. A device according to claim 23, wherein there is a basket to accommodate the products to be deep-fried, which basket can be inserted into the vat, the side walls of which basket are closed and, when the basket is inserted, extend beyond the upper edge of the vat, and the bottom of which basket has openings to drain off the fat.

27. A device according to claim 26, wherein the openings in the bottom of the basket are dimensioned such that the particles in the basket that have separated from the deep-fried products are retained in the basket.

28. A device according to claim 26 wherein between the side walls of the inserted basket and the vat there is a gap to carry away the fat issuing from the bottom of the basket through the openings.

29. A device according to claim 8, wherein the device housing forms a gap with the side walls of the vat for accommodating the products to be deep-fried, to carry away the fat issuing from the vat over the upper edge of the vat to the heating device.

30. A device according to claim 8, wherein there is an opening in the bottom of the deep-frying vat, which opening is can be closed during a deep-frying process and, at an end of the deep-frying process, can be transferred to an open position either manually by means of a slide-in cleat or by means of an activating device, in order to drain off the fat.

31. A device according to claim 8, wherein there is a filtering station, which is located downstream below the deep-frying vat in an upper region of a fat collection zone, such that an entire stream of fat must pass through the filtering station during a deep-frying phase or when the fat is being drained off.

32. A device according to claim 31, wherein alternatively, there is a filtering station between the fat collection zone and the heating device.

33. A device according to claim 9, wherein there is a branch in the connecting pipe, which branch opens out into the upper region of the fat collection zone and can be released by means of a temperature-controlled magnetic valve or a thermostatic valve, so that a stream of fat can be fed in a small cycle in the direction of flow directly to the fat collection zone and bypass the direction of flow through the deep-frying vat provided the fat has not yet reached the deep-frying temperature, and which branch can be blocked off as soon as the fat has reached the deep-frying temperature, wherein the direction of flow is closed off and the direction of flow through the vat is opened up.

34. A device according to claim 8, wherein the heating device has panel heaters, which are so arranged in parallel at a short distance from each other, that they form a meandering or wavy flow path for the fat that is flowing through.

35. A device according to claim 9, including a fat level detection device positioned in the fat collection zone to detect a level of fat in the fat collection zone, and an inlet for fresh fat being located in the fat collection zone, the fat level detection device controllingly connected to the refilling device to control an inflow of fresh fat to maintain a predefined fat level in the fat collection zone.

36. A device according to claim 8, wherein to drain off the fat, there is an outlet cock at least at the a deepest point of the circuit.

\* \* \* \* \*